June 2, 1931.  J. M. OSGIAN  1,808,316
SIGNAL SWITCH
Filed Dec. 16, 1926
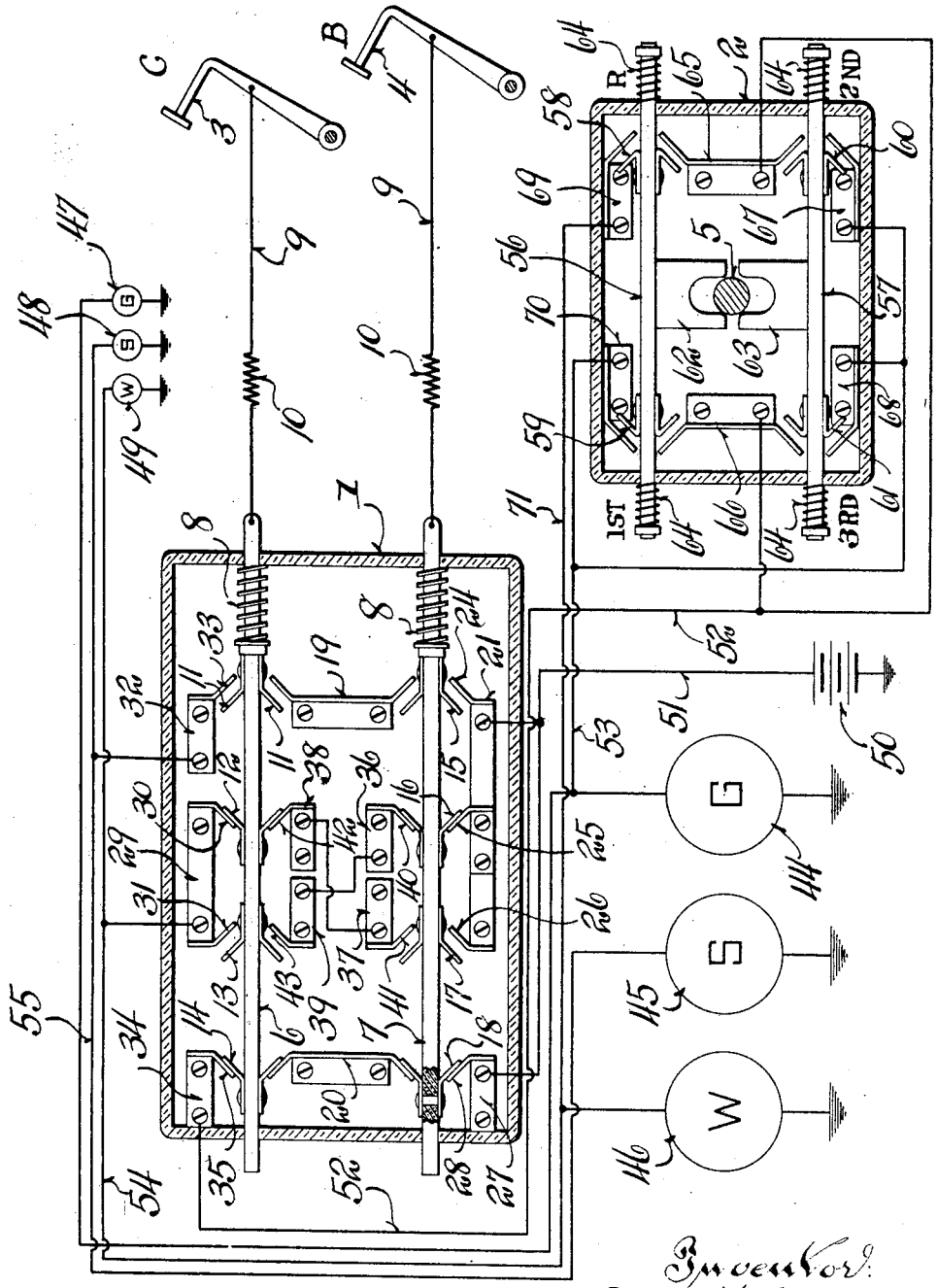
Inventor:
James M. Osgian
By
Attorneys Patented June 2, 1931

1,808,316

UNITED STATES PATENT OFFICE

JAMES M. OSGIAN, OF RACINE, WISCONSIN

SIGNAL SWITCH

Application filed December 16, 1926. Serial No. 155,244.

This invention relates to signal switches and is particularly directed to a signal switch for automobiles.

In automobile signalling systems as heretofore constructed, it is the usual practice to provide a switch for the brake pedal so that the following driver is appraised of the fact that the brake is being applied and, consequently, a stop is indicated. However, there is no intermediate signal for slowing down, prior to this "stop" signal. In addition to this, it frequently happens that drivers have different orders in which they press the brake and clutch pedals. Some drivers apply the brake before they open the clutch, while others open the clutch before they apply the brake and, consequently, the standard signal does not function to meet all conditions.

This invention is designed to overcome the defects noted above and objects of this invention are to provide a novel form of signal switch for automobiles related to a signal system in which a "warning" signal and a "stop" signal are both provided, and in which the "warning" signal is operated from either the brake or the clutch pedal, so that the action of the system is the same, whichever order of operation of the pedals is followed, and to further provide the system with means for giving a "stop" signal after the "warning" signal has been given, when both pedals are depressed.

Further objects are to provide a signalling system in which a "going" signal is given whenever the shift gear is in any of its operative positions and the clutch in and brake off, so that whenever the car is travelling, a "going" signal is given, and yet in which when the car is standing still and the shift gear in neutral no "going" signal is given, and in which a "warning" signal is given whenever the shift gear is moved into reverse. In general, this invention is an improvement over that disclosed in my co-pending application for signal switches, filed October 11, 1926, Serial No. 140,915.

Further objects are to provide a novel form of signalling system in which the "warning", the "stop", and the "going" signals are duplicated on the dash of the automobile, so that the driver is aware at all times of the exact signal given.

An embodiment of the invention is shown in the accompanying drawing in which:

The figure is a diagrammatic view showing the brake and clutch switch and the transmission switch associated in the wiring system in their correct relations.

Referring to the drawing, it will be seen that two main casings 1 and 2 are provided. The casing 1 is associated with a clutch pedal 3 and brake pedal 4, and the casing 2 is associated with the shift gear lever 5.

It is to be noted that the casing 1 carries two elongated plunger rods 6 and 7 formed of insulating material and each carrying several groups of contacts hereinafter described. Each of the rods is provided with a spring 8, preferably a compression spring, and is connected by means of a flexible connector 9 with the appropriate pedal. Preferably, these flexible connectors are provided with springs 10 intermediate their length, so that undue tension can not occur.

Consider the clutch switch rod 6. This rod is provided with a plurality of contact fingers or movable contacts arranged in pairs, as indicated at 11, 12, 13, and 14. The contact fingers on opposite sides are joined by means of the rivets which pass through the insulating rod 6, as indicated in the figure. Similarly, the rod 7 is provided with pairs of fingers or movable contacts 15, 16, 17, and 18. Adjacent the ends of the casing, stationary contact blocks 19 and 20 are provided which carry fingers adapted to engage the fingers 11 and 15 and the fingers 14 and 18 respectively, when the parts are in the positions described hereinafter. Further, an elongated contact block 21 is provided with fingers 24, 25, and 26, which engage the fingers 15, 16, and 17, under certain conditions. A contact block 27 is provided with a finger 28 which engages the finger 18. On the other side of the casing 1, a central contact block 29 is provided with fingers 30 and 31 which engage the fingers 12 and 13 respectively. Also a contact block 32 is provided with a finger 33, and a contact block 34 is provided with a finger 35 adapted to engage the fingers 11 and 14, respectively.

Centrally of the casing 1, contact blocks are provided, as indicated at 36, 37, 38, and 39, provided with fingers 40, 41, 42, and 43, respectively. These contact blocks are connected as follows:

Contact block 36 is connected to contact block 39, and contact block 37 is connected to contact block 38. Thus, there is a crossing of the connections in the central portion of the brake and clutch pedal switch casing as just pointed out. The purpose of this will be hereinafter more fully set forth. The signalling system is provided with three main lights, namely, a "going" light 44, a "stop" light 45, and a "warning" light 46. These lights are at the rear of the machine and similar indicating or tell-tale lights 47, 48, and 49, are provided on the dash or in a convenient position within the car for the benefit of the driver.

The system is supplied from the usual battery 50 which is grounded on one side and connected by means of a conductor 51 to the contact block 21 and to the contact block 27. Assume, for example, before discussing the shift gear switch that the parts are in the position shown. Current will pass from the battery to the contact block 27, through the fingers 18, to the contact block 20, through the fingers 14 to the contact block 34. From thence, current passes by means of conductor 52 to the shift gear switch, through such switch, assuming the shift gear is in operative position, and outwardly through conductor 53 to the "going" light 44, the other side of the "going" light being grounded, as indicated. Further, the tell-tale "going" light, it will be noted, is in parallel with the "going" light 44, and consequently is illuminated. This condition corresponds to a position of the parts in which the clutch is in, the brake off, and the shift gear in one of its operative forward positions.

Assuming now that the driver intends to change the speed of the car either for a stop or for some other purpose. Obviously, he throws the clutch out or else applies the brake. Assume, for example, that the clutch pedal 3 is depressed. Under these conditions, the "going" light circuit is opened, and such light is, therefore, extinguished. Current now passes from the battery to the contact block 21 and from thence by means of the fingers 16 to the contact block 36. From this point, current passes to the contact block 39. From the contact block 39 current passes by means of the fingers 13 to the contact block 29. From this contact block 29, current passes by means of conductor 54 to the "warning" light 46, and to the tell-tale "warning" light 49, which is in parallel with the light 46. Thus, a warning is given of a change in speed of the car or some change from the present status of travel.

If, on the other hand, it is assumed that the clutch pedal is not depressed, but the brake pedal depressed, it will be seen that current still passes to the "warning" light as it flows from the battery to contact block 21, from thence by way of fingers 17 to contact block 37 and contact block 38. From the contact block 38, current passes by means of the fingers 42 to the contact block 29. Thus, the circuit to the "warning" light is established even under these conditions.

When the driver intends making a stop, obviously after the "warning" is given, it is desirable that the "stop" light be illuminated. This is accomplished, for, it will be seen, that when both the brake and clutch pedals are depressed, current passes from the battery to the contact block 21 by means of fingers 15 to the contact block 19, and from thence by means of fingers 11 to the contact block 32. From this point current passes by means of the conductor 55 to the "stop" light 45 and to the tell-tale "stop" light 48.

Broadly, it will be seen, therefore, that three systems or arrangements of switches are provided in the casing 1. Those shown at the rear end in the figure control the "going" light. Those shown in the center, control the "warning" light. Those shown at the forward end, control the "stop" light.

It has been stated above that the "going" light circuit passes through the shift gear switch. This shift gear switch will now be described. The parts are carried in the casing 2, as shown in the figure, and the shift gear lever 5 passes centrally through the casing. Two insulating rods 56 and 57 are provided in each case with two pairs of contacts, namely, the rod 56 has one pair of contacts 58 at its forward end, and a second pair of contacts 59 at its rear end. The rod 57 has a forward pair of contacts 60 and a rear pair of contacts 61. Further, it is to be noted that these rods are provided with notched inwardly projecting members 62 and 63 which stand adjacent the shift gear lever when the shift gear lever is in neutral position. Springs 64 are provided tending to hold the rods in their neutral position.

It is to be noted that conductor 52 is connected to the two central contact blocks 65 and 66 which are provided with fingers adapted to engage either set or pairs of fingers, indicated by the reference characters 58, 59, 60, and 61. Further, it is to be noted that a contact block 67 and a contact block 68 are provided on the outer side of the rod 57 and similarly, contact blocks 69 and 70 are provided and located on the outer side of the rod 56. The contact blocks 67, 68, and 70 are connected to conductor 53.

From the previous description of the operation of the clutch and brake switch, it will be noted that the current passes to the shift gear switch by means of the conductor 52. When the shift gear lever is in any one of its driving positions, for example, first speed forward, it will be noted that the lever 5 has engaged the member 62 and shifted the rod 56 rearwardly. This connects contact block 66 with contact block 70 and consequently connects conductor 52 with conductor 53. Similarly, after the shift gear is in second forward position or its third forward position, the shift gear lever 5 has then engaged the member 63 and has connected either contact block 67 with contact block 65 or has connected contact block 68 with contact block 66. Under either condition, conductor 52 is connected with conductor 53 and thus the "going" signal is given. When the shift lever 5 is thrown into reverse it engages the member 62 and moves the rod 56 forwardly. This causes a connection to occur between contact block 65 and contact block 69. This connects conductor 52 with a conductor 71 which leads directly to the "warning" light 46. This connection corresponds to that in which the shift lever is in reverse, the clutch closed, and the brake open. If, however, either the clutch was out and the brake on, the "warning" light would be given independently of the shift gear, as previously described. It will be seen from this that the "warning" light is illuminated whenever the brake is applied or the clutch out, and also is applied whenever the brake is off and the clutch in and the shift gear is moved into reverse.

It is to be noted that an absolutely foolproof system has been provided by this invention in which not only a "stop" signal is controlled, but also a "going" signal and a "warning" signal.

Further, it will be seen that the control of these parts is wholly independent of the voluntary control of the operator as they are controlled through the ordinary mechanism used in operating the automobile and the several combinations worked out above are automatically effected without any thought or effort on the operator's part.

It will be seen further that a system of signals has been provided and controlled by relatively simple switches so as to accommodate any condition of operation of the car.

Although the invention has been described in considerable detail, such description is intended as illustrative rather than limiting as the invention may be variously embodied and as the scope of such invention is to be determined as claimed.

I claim:

In a signalling system, a casing, spaced rods movably mounted in the casing, a pair of separate contacts carried by each rod adjacent each end, a pair of separate contacts on each rod at opposite sides of its center, a pair of separate contacts adjacent each end of the casing and upon opposite sides of its longitudinal center, a pair of separate contacts at each side of the longitudinal and of the transverse center of the casing at the central portion thereof, and means for imparting movement to the rods whereby the contacts on one end of the rod will engage the contacts at one end of the casing, and one pair of separate contacts adjacent the center of the rod will engage one pair of the contacts adjacent the central portion of the casing.

In testimony that I claim the foregoing I have hereunto set my hand at Racine, in the county of Racine and State of Wisconsin.

JAMES M. OSGIAN.